US012756740B2

(12) United States Patent
Becker et al.

(10) Patent No.: US 12,756,740 B2
(45) Date of Patent: Oct. 6, 2026

(54) METHOD AND APPARATUS FOR PREVENTING MALICIOUS NETWORK TRAFFIC

(71) Applicant: marbis GmbH, Karlsruhe (DE)

(72) Inventors: André Becker, Karlsruhe (DE); Steffen Weise, Leipzig (DE); Stefan Reusch, Salzweg (DE); Leopold Schabel, Freiburg (DE)

(73) Assignee: marbis GmbH, Karlsruhe (DE)

( * ) Notice: Subject to any disclaimer, the term of this patent is extended or adjusted under 35 U.S.C. 154(b) by 27 days.

(21) Appl. No.: 18/698,141

(22) PCT Filed: Oct. 24, 2022

(86) PCT No.: PCT/EP2022/079544

§ 371 (c)(1), (2) Date: Apr. 3, 2024

(87) PCT Pub. No.: WO2023/072810

PCT Pub. Date: May 4, 2023

(65) Prior Publication Data

US 2024/0430298 A1 Dec. 26, 2024

(30) Foreign Application Priority Data

Oct. 25, 2021 (DE) ......................... 102021127714.0

(51) Int. Cl.
*H04L 9/40* (2022.01)

(52) U.S. Cl.
CPC ...... *H04L 63/1458* (2013.01); *H04L 63/0245* (2013.01); *H04L 2463/142* (2013.01)

(58) Field of Classification Search
CPC ............. H04L 63/1458; H04L 63/0245; H04L 2463/142; H04L 63/0227
See application file for complete search history.

(56) References Cited

U.S. PATENT DOCUMENTS 10,841,088 B2 11/2020 Fan
2011/0145572 A1* 6/2011 Christensen .......... H04L 63/126 713/160

(Continued)

FOREIGN PATENT DOCUMENTS

DE 60206856 12/2005
JP 2001325227 A 11/2001

(Continued)

OTHER PUBLICATIONS

Mohammed Alhabeeb et al: "Preventing Denial of Service Attacks in Government E-Services Using a New Efficient Packet Filtering Technique", Parallel and Distributed Processing With Applications (ISPA), 2011 IEEE 9th International Symposium on, IEEE, pp. 262-269, May 26, 2011.

(Continued)

*Primary Examiner* — Mohammad W Reza
(74) *Attorney, Agent, or Firm* — Volpe Koenig

(57) ABSTRACT

A method (100) for preventing malicious network traffic is described, the method including: providing (110), by a key generation appliance, a client key to a client device; receiving (120), by a control appliance, a data packet intended for an application server from the client device; determining (130), by the control appliance, whether the data packet includes the client key; forwarding (140) the data packet, by the control appliance, to the application server in response to a determination that the data packet comprises the client key; and/or blocking (150) the data packet, by the control appliance, in response to a determination that the data packet does not include the client key. Further, an apparatus (360) and a system (300) are provided that are configured to perform the method (100).

14 Claims, 3 Drawing Sheets

(56) References Cited

U.S. PATENT DOCUMENTS

| | | | |
|---|---|---|---|
| 2012/0159159 A1 | 6/2012 | Messerges et al. | |
| 2014/0071907 A1* | 3/2014 | Roeland | H04W 76/12 370/329 |
| 2021/0056539 A1* | 2/2021 | McCauley | G06Q 20/223 |
| 2022/0045854 A1* | 2/2022 | Bareket | H04L 9/0891 |
| 2022/0094706 A1* | 3/2022 | Higgins | H04L 63/0209 |

FOREIGN PATENT DOCUMENTS

| | | |
|---|---|---|
| JP | 2005141654 A | 6/2005 |
| JP | 20185447 A | 1/2018 |
| WO | 2010024379 A1 | 3/2010 |

OTHER PUBLICATIONS

P. Ananthi et al: "Two level Authentication and Packet Marking Mechanism for Defending against DoS and DDoS Attacks", International Journal of Computer Applications, vol. 63, No. 7, pp. 41-45, Feb. 1, 2013.

* cited by examiner

METHOD AND APPARATUS FOR PREVENTING MALICIOUS NETWORK TRAFFIC

CROSS-REFERENCE TO RELATED APPLICATIONS

This application is a 371 National Phase of PCT/EP2022/079544, filed Oct. 24, 2022, which claims priority to German Patent Application No. 10 2021 127 714.0, filed Oct. 25, 2021, both of which are incorporated herein by reference as if fully set forth.

BACKGROUND

Malicious network traffic may be encountered in various types of network structures. It may, inter alia, be used to perform attacks against application servers, such as game servers, in networks comprising the application server and a plurality of client devices, such as game clients or game client devices.

Malicious network traffic, in particular game traffic, may comprise a particularly high amount of data packets transmitted from a malicious user of one of the client devices to the game server. In a successful attack, the application server or the network connection may be so overwhelmed by the received malicious traffic that it cannot keep up with the work for legitimate users or that the network port of the application server is congested. That results in the service provided by the application server not being available to the legitimate users anymore, which is generally referred to as a denial of service (DOS), caused by a DoS-attack. A DoS-attack performed by a particularly high number of client devices is generally referred to as a distributed denial of service (DDoS)-attack. In various network structures, an attack is already considered successful when the attacker is or the attackers are able to degrade service quality, e.g., by causing lag.

Conventional methods and apparatus aim to prevent said successful DoS- or DDOS-attacks by mitigating the load of malicious network traffic reaching an application server and/or to maintain a reasonable service quality available to legitimate users while an attack is happening. This is generally done by recognizing patterns within the received network traffic. As every application, in particular every game application, normally requires different game protocols and thus different or differently structured payloads of the data packets, known pattern recognition processes are generally based on the content of the header of data packets comprised by the network traffic, rather than by the payload of the data packets.

Patterns within the network traffic may be recognized based on predetermined or known patterns that are considered to represent an attack. Alternatively, patterns may be recognized by identifying a (substantial) deviation within the workload or network traffic that was previously received or that appears during normal operations when no attacks take place.

However, these protection measures can be circumvented relatively easily, as the information contained in the header, in particular source information, e.g. the IP address of the client device, may be altered or forged. Moreover, particular network structures exist, for example a gaming network comprising a game server and a plurality of client devices, in which no or a relatively low amount of malicious network (game) traffic reaching the application server can be tolerated without substantially impacting network traffic factors influencing user experience, such as increasing an application server response time or lag.

However, the recognition of patterns takes time. For example, a single new connection from a specific range of IP addresses could be a legitimate user. Thousands of connection attempts from that IP address range may represent a pattern and may thus be classified as an attack. Hence, due to the delay in recognition, too few malicious data packets may be blocked.

Beyond that, such systems or processes may be exploited, as patterns may be created by malicious users in order to have one or more legitimate users blocked. For example, knowing the IP address or an IP address range of at least one legitimate user, an attacker may spoof traffic to originate from the IP address or the IP address range of the one or more legitimate users, causing the system or process to block legitimate network traffic that shares properties with the maliciously created pattern. In other words, too many data packets may be blocked.

The problem underlying the present invention therefore is to improve network attack protection, in particular to provide an improved protection method, apparatus or system for preventing malicious network traffic from reaching an application server.

SUMMARY

According to one of many embodiments, there is provided a method for preventing or blocking malicious network traffic, the method comprising: providing, by a key generation appliance, a client key to a client device; receiving, by a control appliance, a data packet intended for an application server from the client device; determining, by the control appliance, whether the data packet comprises the client key; forwarding the data packet, by the control appliance, to the application server in response to a determination that the data packet comprises the client key; and/or blocking the data packet, by the control appliance, in response to a determination that the data packet does not comprise the client key.

In other words: The data packet is forwarded by the control appliance only in response to a determination that the data packet comprises the client key. That is, the control appliance may, as a default action, block all data packets, i.e., all traffic, not comprising the client key provided by the key generation appliance to the client device. Hence, malicious network traffic may be reliably detected on a packet-by-packet basis, thereby identifying and blocking single, in particular first, malicious network packets of an attack. In that manner, a deterministic approach is provided which may prevent a substantially increased number of, in particular all, malicious data packets from reaching the application server.

Additionally, or alternatively, a plurality of data packets intended for the application server may be received, in particular successively received, by the control appliance, from the client device, wherein the control appliance determines whether multiple, in particular all, of the plurality of data packets comprise the client key and forwards all data packets of the multiple data packets that comprise the client key to the application server and/or blocks all data packets of the multiple data packets that do not comprise the client key. For example, the plurality of data packets may comprise a first and a subsequently received second data packet.

More particularly, the control appliance may block all data packets of the multiple data packets that do not comprise the client key and forward the remaining data packets of the plurality of data packets to the application server. In this way, a balance between the speed of processing or forwarding data packets and system security can be set, thereby increasing the system's efficiency.

In the above defined method, the client key may be a client token. The key generations appliance may comprise a token application programming interface, API, to provide the client token.

The key generation appliance and the control appliance may be communicatively coupled. The key generation appliance and the control appliance may exchange the or one or more respective client key(s). Alternatively, or additionally, the key generation appliance and the control appliance may be in possession of, i.e. have stored, and/or may have previously communicated and/or may communicate key generation data based on which the or one or more respective client key(s) may be generated and/or validated. In other words: The control appliance may be configured to validate if the client key was generated by the key generation appliance, for example based on a shared secret, a shared key generation process and/or shared key generation data.

Additionally, or alternatively, the key generation appliance and the control appliance may be comprised by a (higher level) device, e.g. a network traffic control device. Additionally, or alternatively, the key generation appliance may be comprised by the control appliance, or vice versa.

Additionally, or alternatively, the key generation appliance, the control appliance and/or the network traffic control device may be comprised by the application server and may prevent malicious data packets from reaching a specific server application within the server, such as a game application, as pointed out above.

According to one embodiment, determining whether the data packet comprises the client key, includes: determining whether the client key comprised by the data packet is valid.

For example, the key generation appliance may provide the client with a plurality of client keys, in particular, periodically provide the client device with a, in particular a new, client key. Thereby, only the most recently received client key may be a valid client key. Thus, the client key may be regularly or periodically exchanged, thereby invalidating previous client keys.

Additionally or alternatively, the client key may (only) be valid for a predetermined amount of time. In other words, the client key may be (automatically) invalidated after a predetermined amount of time has expired. In one example, the key generation appliance may provide the client with a plurality of client keys, in particular, periodically provide the client device with a new client key upon request of the client device. Put in another way: The client device requests a new client key if the client key has expired or prior to the expiration of the client key. In that manner, the method allows for an enhanced prevention of data packets with forged or intercepted client key from reaching the application server.

According to one embodiment, determining whether the data packet comprises the client key, includes: determining, in particular based on a timestamp of the client key, whether the client key comprised by the data packet has not expired.

The timestamp may be indicative of the point in time when the client key was generated and/or when the client key was provided to the client device. In other words: the method may comprise the step of determining, based on the timestamp of the client key, whether a predetermined time interval has expired since the generation and/or provision of the client key.

Additionally, or alternatively, the timestamp may be indicative of the point in time when the client key comprised by the data packet expires. In other words: The method may comprise the step of determining, by the key generation appliance, in particular while generating the client key, the point in time when the client key will expire and/or a time period after which the client key expires; and determining, by the control appliance, based on the timestamp of the client key, whether the point in time has passed and/or whether the time period has lapsed.

Thereby, a client key may be provided to the client device that is valid only for a limited, in particular predetermined, time period, for example about a time period of less than 1 minute, of about 1 minute, of about 1-5 minutes or of about 1-30 minutes. In that manner, malicious users may be prevented from performing attacks based on extracted or intercepted client keys, for example by inspecting others or their own network traffic.

According to one embodiment, the client key provided to the client device is a first client key, and determining whether the data packet comprises the client key, comprises, in particular consists of: determining, whether the data packet comprises the first or a second client key, wherein the second client key is derivable from the first client key.

The second client key may be a part of the first client key, in particular may be shorter than the first client key and/or may comprise fewer bytes than the first client key. In other words: The second client key may represent a fraction of the first client key, for example ½ of, ¼ of, 1/16 of or 1/32 of the first client key, in particular the first ½ of, the first ¼ of, the first 1/16 of or the first 1/32 of the first client key. In one example, the first client key comprises or consists of 64 bytes, wherein the second client key comprises or consists of the first 4 bytes of 64 bytes of the first client key.

The second client key may be derivable from the first client key based on a shared secret, e.g. a secret shared between the key generation appliance and the control appliance. For example, the second client key may be derivable from the first client key by XORing a or the part of the first client key with the shared secret. The shared secret may be a static secret. Alternatively, or additionally, the second client key may be derivable from the first client key by taking a fixed set of non-consecutive bits from the first client key, hashing the first client key and taking specific bits from the result, and/or by any other deterministic computation that can be performed on the first client key to derive the second client key.

Thereby, the size of the data packets to be transmitted and/or packet transmission time may be reduced. In particular, the time spent by the control appliance for determining whether the data packet forms malicious network traffic, i.e., whether or not the data packet comprises the client key, may be reduced. Moreover, the control appliance may store only the second client key, thereby efficiently using the storage capacities available to the control appliance.

In addition, by using the second client key, in particular a second client key comprising a specific bit sequence that is not comprised by the first client key, forging the second client key, e.g. by a malicious user inspecting their own traffic, is hindered. Thus, the security of the method is further enhanced.

According to one embodiment, determining whether the data packet comprises the client key, comprises, in particular consists of: determining, whether a previous data packet previously received from the client device comprises the first client key; and determining whether the data packet comprises the second client key; and/or wherein determining whether the data packet comprises the first client key, comprises, in particular consists of: determining, whether a previous data packet previously received from the client device comprises the second client key; and determining whether the data packet comprises a third client key different from the second client key, wherein the third client key is derivable from the first client key.

The third client key may be of the same length as the second client key. A different short client key, e.g. a different second or third client key may be sent with every packet. E.g. the data packet may first comprise the first two bytes of the first client key, then the second two bytes, and so forth, or an arbitrary permutation of that sequence, or a sequence of different values derived from the first client key as described above. The control appliance may then expect to receive a specific pattern of different short client keys (second and/or third client keys) and will then, for example, block traffic that always includes the same short client keys (second and/or third client keys).

The method may also comprise the step of determining, whether the previously received data packet and the (subsequently received) data packet are received from the same client device. Said determination may be based on parameters or source information comprised or indicated by the data packets, in particular the respective headers of the data packets.

In that manner, a part of the client key or a shorter client key derivable from the complete client key is only accepted as the complete client key if the complete client key was comprised by a previous or first data packet received from the client device. Thereby the size of the subsequent data packets to be transmitted and/or the packet transmission time is reduced whilst securely protecting the application server from attacks.

Moreover, by altering the part of the client key or the shorter client key derivable from the complete client key, the security of the method is further enhanced.

According to one embodiment, determining whether the data packet comprises the client key, comprises: determining, whether the client key comprised by the data packet is associated with the client device and/or a user of the client device.

The client key may be associated with the client device or a user, in particular a user account of a user, of the client device, i.e., may be different for each client device or user of the client device. In that manner, the (user of a) transmitting client device of a received data packet may be reliably identified.

The determination may, for example, be based on source information, e.g., the IP address, indicated in the data packet, in particular in the header of the data packet, whereas the client key may be incorporated in the packet payload. Hence, both the packet header and the packet payload are used to recognize traffic as legitimate or malicious. Thereby, network attack protection, in particular the security of the described method, is further enhanced.

According to one embodiment, determining whether the data packet comprises the client key, comprises: determining, whether the data packet comprises the client key at a predetermined position within the data packet, in particular within a payload and/or a header of the data packet.

The client key may be comprised within the data packet at the end of the header or at the beginning of the payload, thereby extending a, in particular standardized, data packet header. Providing the client key at the predetermined position may further reduce processing time of the control appliance, i.e., the data packet transmission time from the client device to the application server via the control appliance and/or may allow the implementation of the method within various types of network structures.

According to one embodiment, the method further comprises: receiving, by the key generation appliance, an authentication key, wherein the authentication key is indicative of an authentication of the client device and/or a user of the client device; providing, by the key generation appliance, the client key to the client device in response to the receipt and/or a validation of the received authentication key.

In particular, the key generation appliance may provide the client key to the client device only in response to the receipt and/or a validation of the received authentication key. Accordingly, the key generation appliance may provide any subsequent client key to the client device only in response to a respective additional or repeated receipt and/or validation of the received authentication key. Alternatively, the key generation appliance may (periodically) provide a (new) client key to the client device in response to the initial receipt and/or validation of the received authentication key.

The authentication key may be received, by the key generation appliance, from an authentication appliance or directly from the client device. In other words: The authentication key is exchanged with the client key at the key generation appliance. The authentication key may be an authentication token representing an authentication of the client device or a user (account of the user) of the client device, such as a JSON Web Token. The authentication key may contain a digital signature of the authentication appliance.

Exchanging the authentication key with the client key, i.e., incorporating the client key in the data packet rather than using the authentication key directly, not only enhances the protection against forgery, but also increases the efficiency of the method, in particular the determination/validation of the client key by the control appliance. For example, the client key may be smaller in size and be particularly designed for the determination and validation mechanism within the controlling appliance.

Furthermore, the separation of the authentication key and the client key allows for reduced coordination between the systems controlled by an authentication appliance providing the authentication key and the control appliance/key generation appliances. For example, new key clients may be periodically created, including changing the whole structure of the key client, without the need of changing the authentication key or adapting the authentication appliance.

According to one embodiment, the method further comprises: receiving, by the key generation appliance, a platform key associated with the client device; providing, by the key generation appliance, the client key to the client device in response to the receipt and/or a validation of the received platform key.

In particular the key generation appliance may provide the client key to the client device only in response to the receipt and/or a validation of the received platform key. The platform key may be received from the client device. Alternatively, or additionally, the platform key may be received from or via the authentication appliance. For example, the key generation appliance, may provide the client key to the client device only if both the authentication key and the platform key was received and/or a validated.

The platform key may be a static key or secret that is associated with, i.e., baked into the client, and therefore may only change on client updates. The requirement of the platform key allows for identifying reverse-engineering attempts by malicious users, for example when the authentication appliance receives requests for a client key with a valid authentication key but an invalid platform key, or vice-versa.

According to one embodiment, the method further comprises: receiving, by an authentication appliance, user credentials of a or the user of the client device; transmitting, by the authentication appliance, the or an authentication key to the key generation appliance and/or to the user device in response to the receipt of the user credentials and/or a validation of the received user credentials.

For example, a user of a client device may send user credentials to the authentication appliance. In response thereto, the authentication appliance may provide the user or client device with the authentication key which may be used for indicating to other appliances or services the authentication of the user or the client device. Those other appliances or services only need to validate the authentication key and do not need to verify the credentials again. As the receipt and/or validation of the user credentials is (already) performed by the authentication appliance and the control appliance operates with the client key that was exchanged with the authentication key, the efficiency and reliability of the method is further increased. Moreover, by providing a client key only upon the authentication of a user, a user account or the client device, any client key and thus any received data packet comprising a client key may be tied to the authenticated user, user account or client device. Thereby, the process of identifying and blocking malicious users or user devices is enhanced.

According to another, possibly independent embodiment, there is provided an apparatus for preventing or blocking malicious network traffic, the apparatus comprising: a control appliance; and a key generation appliance; wherein the apparatus is configured to perform any of the above described methods.

According to another, possibly independent embodiment, there is provided a system for preventing malicious network traffic, the system comprising: the above described apparatus; an authentication appliance, wherein the authentication appliance is configured to: receiving user credentials of a or the user of the client device; transmitting the or an authentication key to the key generation appliance in response to the receipt of the user credentials and/or a validation of the received user credentials.

According to one embodiment, the system further comprises: the application server; and/or the client device.

According to another, possibly independent embodiment, there is provided a computer program comprising instructions which, when the program is executed by a computer, cause the computer to carry out one of the above described methods.

According to another, possibly independent embodiment, there is provided a computer-readable medium comprising instructions which, when executed by a computer, cause the computer to carry out one of the above described methods.

BRIEF DESCRIPTION OF THE DRAWINGS

The present invention may be better understood from reading the following description of non-limiting embodiments, with reference to the attached drawings, wherein.

DETAILED DESCRIPTION

Figure 1:
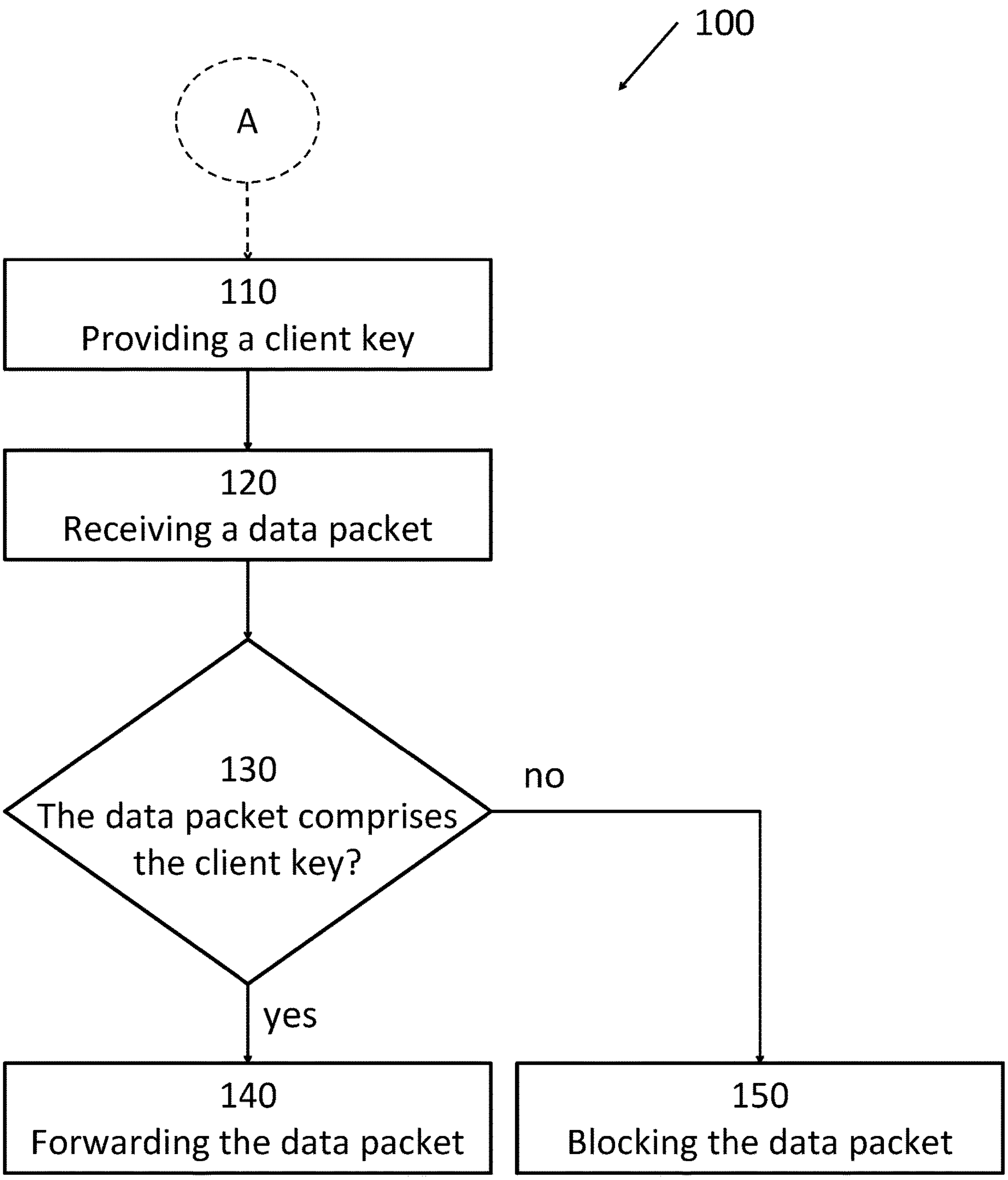
FIG. 1 shows a flowchart of a first method for preventing malicious network traffic.

FIG. 1 shows a flowchart of a method 100 for preventing or blocking malicious network traffic, in particular for preventing malicious network data packets from reaching an application server. The method 100 may be performed by a at least some of the network components comprised by the network system 300 shown in FIG. 3.

The method 100 starts with step 110 in which a client key is provided by a key generation appliance 340 to a client device 330. The key generation appliance 340 may be comprised by a network traffic control device 360. In other words, the client key may be provided to the client device 330 by the network traffic control device 360.

The client key may be a key generated by the key generation appliance 340. The client key may further be particularly designed for a control process performed by a control appliance 320 as described in more detail below.

The network system 300 and the method 100 may be a system and a method used for a gaming application, for example for an online gaming application. That is, the client device 330 may be a game client. The application server 310 may be a game server. The key generation appliance 340 may be a token API. The client key may herein also be referred to as a first client key or a client token, in particular a client long token.

The client key may be generated for, and/or associated with, a specific client device 330. The client key may be provided to the client device 330 upon request. For example, the key generation appliance 340 may provide client device 330 with the client key, i.e. transmit the client key to the client device 330, in response to a request received by the client device 330.

In step 120, a control appliance 320 receives a data packet from the client device 330. The data packet is intended for the application server 310. In other words, the client device 330 transmits the data packet to the application server 310 via control appliance 320.

The control appliance 320 may be comprised by the network traffic control device 360. In other words, the data packet intended for the application server 310 may be received by the network traffic control device 360.

In step 130, the control appliance 320 determines whether the data packet received from the client device 330 comprises the client key that was previously provided to the client device 330 by the key generation appliance 340 in step 110.

If the data packet received from the client device 330 comprises the client key, as determined in step 130, the control appliance 320 forwards the data packet to the application server 310. If the data packet received from the client device 330 does not comprise the client key, as determined in method step 130, the control appliance 320 blocks the data packet in step 150, i.e. does not forward the data packet to the application server 310.

Thereby, all data packets that do not comprise the client key and that are transmitted from the client device 330 to the application server 310 are prevented from reaching the application server 310 by the control appliance 320 controlling the network traffic between client 330 and application server 310.

In that manner, the network traffic between the client device 330 and the application server 310 is controlled on a packet-by-packet basis. In other words, the control appliance

320 may determine, whether a data packet belongs to malicious network traffic or is part of a network attack, such as a DDOS attack, based on the content of the data packet itself.

That is to say that the control appliance 320 may even detect a first malicious data packet of an attack performed against the application server 310. Hence, the control appliance 320 or any other network component of the network system 300 does not need to detect patterns within the network traffic in order to identify malicious network packets. As a process based on pattern detection inherently blocks too many or too few data packets, the method described herein is able to block (i) all malicious data packets and (ii) only malicious data packets in a deterministic manner.

Referring now in more detail to method step 130 in which the control appliance 320 determines whether the data packet received from the client device 330 comprises the client key that has been previously provided to the client device 330 by the key generation appliance 340.

The control appliance 320 may determine that the data packet comprises the client key only if the client key (or part of the client key, or another client key derivable from the client key, as described below) comprised by the data packet is valid. A valid client key may be the latest or newest client key of a plurality of client keys previously provided to the client device 330 by the key generation appliance 340.

A valid client key may be, for example, a client key that has not yet expired. An expired client key may be a client key that has been replaced by a newer or subsequent client key.

Additionally, or alternatively, a client key (or part of the client key, or another client key derivable from the client key, as described below) may have a limited time of validity. In other words, a client key may be determined to be an expired client key if a predetermined time interval has expired or elapsed since the client key has been generated by the key generation appliance 340 and/or provided to the client device 330. Put in another way, the control appliance 320 may determine an age of the client key, for example based on a timestamp of the client key, and may determine that the client key is an expired client key if the age of the client key exceeds a predetermined threshold age. Additionally, or alternatively, the control appliance 320 may determine that the client key is an expired client key if the point in time or time interval given by a timestamp of the client key has passed. In other words, the key generation appliance 340, in step 110, may define when the client key will expire.

Thus, a new client may be provided to the client device by the key generation appliance 340, in particular upon request by the client device 330, if a previous client key has become invalid and/or has expired or prior to the expiration or invalidation of the client key.

The control appliance 320 may further determine, that the data packet comprises the client key if the data packet comprises at least a part of the client key, in particular (only) a part of the client key or another client key derivable from the client key. In other words, the data packet sent from the client device 330 to the application server 310 via the control appliance 320 may comprise a second client key, or a client short (or tiny) key, or a client short token. The second client key may represent a part of the first (complete) client key. The second client key may be shorter and/or smaller in size compared to the first client key. Put in yet another way: The method may determine that the client is comprised by the data packet even if the data packet (only) comprises the second client key.

In that manner, the data packets sent from the client device 330 via the control appliance 322 the application server 310 may be smaller in size and still comprise the or a valid client key. Moreover, the determination performed by the control appliance 320 in method step 130, whether the data packet comprises the client key, may be performed in a more efficient way, in particular faster. Furthermore, the control appliance 320 may store only the second, i.e. shorter, client key in a memory associated with or used by the control appliance 320, thereby further enhancing the efficiency of the method 100, the network traffic control device 360 and the network system 300.

The control appliance 320 may further determine in step 130 that the data packet comprises the client key by determining that the data packet comprises at least the second client key, in particular only the second client key, in combination with the determination that a previous data packet previously received from the client device comprises the (complete, i.e. first) client key.

In other words, a first data packet sent from the client device 330 to the application server 310 may be forwarded by the control appliance 320, i.e. may pass the control appliance 320, only if said first data packet comprises the first client key or client long key. A subsequently received second data packet sent from the client device 330 to the application server 310 may be forwarded by the control appliance 320 only if the second data packet comprises the first client key or the second client key, i.e. the client short key.

In that manner, it is ensured that the client device is or was in possession of the first client key. Hence, the efficiency of the network system 300 or the method 100 may be enhanced by using the client short key whilst ensuring security and/or reliability of the system and method.

The control appliance 320 may only forward the data packet received from the client device 330 to the application server 310 if the second client key comprised by the second data packet is associated with, i.e. belongs to, is based on, is derivable from, or is a part of, the first client key comprised by a first data packet previously received. Upon provision of a new or subsequent client key by the key generation appliance 340 to the client device 330, the control appliance 320 may only forward a data packet comprising a respective new second client key that may represent a part of the new first client key, if a data packet comprising the new first client key has been previously received. In other words, in order to have all data packets forwarded to the application server 310, the provision of a new client key by the key generation appliance 340 requires the incorporation of the new client key in any subsequent data packet sent by the client device 330.

The control appliance 330 may determine in step 130 that the data packet comprises the client key if the client key comprised by the data packet is associated with the client device and/or a user of the client device. The control appliance 320 may store, or be otherwise in possession of, data pairs indicating that a specific client key belongs, i.e. is associated with, a specific client device and/or a specific user of the specific client device. The control appliance 320 may perform said determination, for example, based on source information comprised by the data packet, in particular comprised in the header of the data packet.

The control appliance 330 may determine in step 130 that the data packet comprises the client key if the data packet comprises the client key at a predetermined position within the data packet. For example the control appliance 330 may determine that the data packet comprise the client key only if the client key is positioned at the and of the header of the data packet and/or at the beginning of the payload of the data packet, or at a predetermined position within the header and/or within the payload of the data packet.

Similarly, the control appliance 330 may determine, in the above-mentioned exemplary method steps comprised by the method step 130, that the data packet does not comprise the client key if the above described requirements are not fulfilled and may thus block the respective data packets, as described with reference to step 150.

Figure 2:
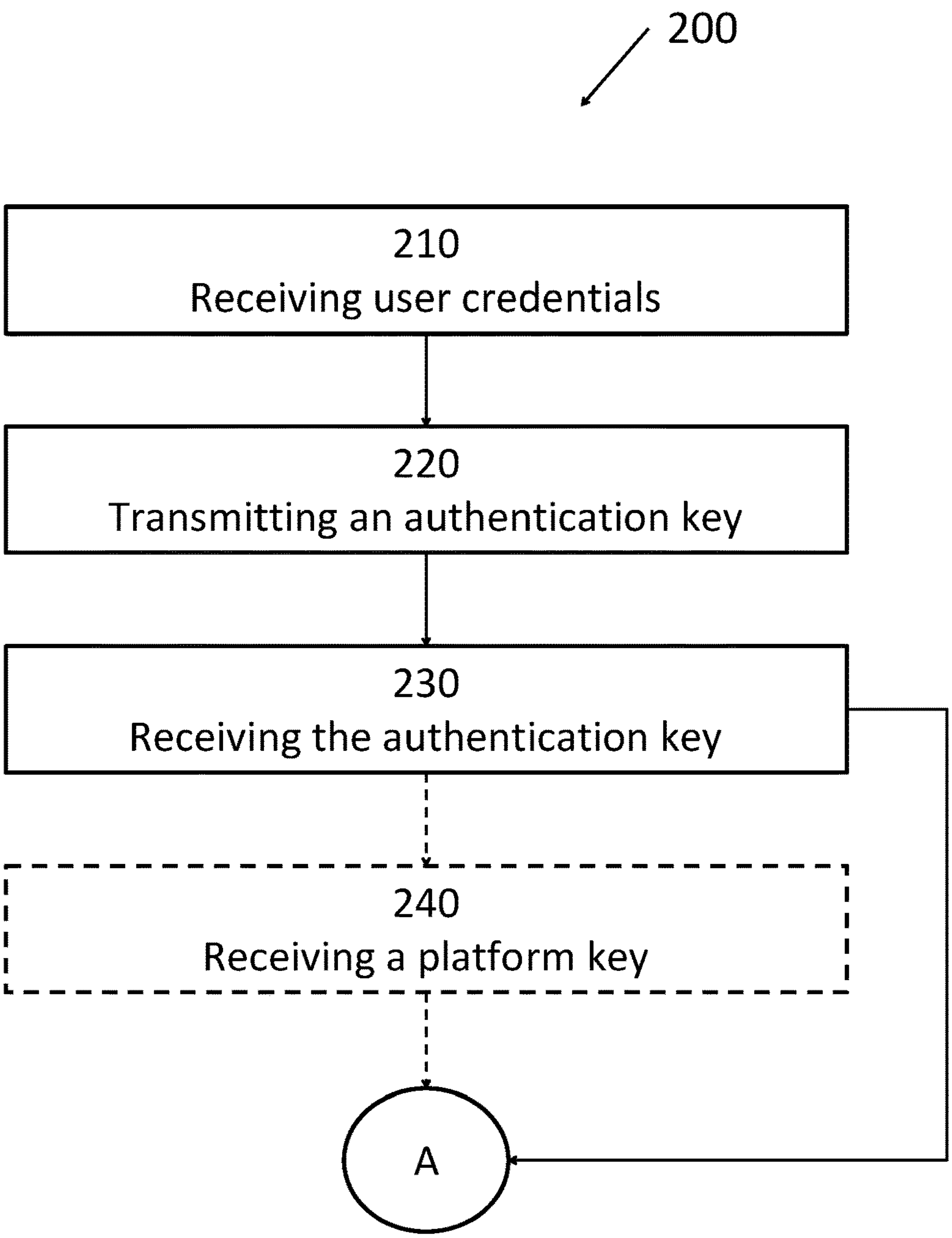
FIG. 2 shows a flowchart of a second method preceding the first method.

Prior to providing the client key by the key generation appliance 340 to the client device 330, the method 100 may perform some or all of the method steps 210 to 240 of method 200, a flowchart of which is shown in FIG. 2.

In a first method step 210 an authentication appliance 350 receives user credentials, i.e. user identification data, such as a user name, and/or user security data, such as a user password, from a user of the client device 330. The user credential credentials may be transmitted from the client device 330 to the authentication appliance 350.

In response to the receipt and/or a validation of the received user credentials, the authentication appliance 350 transmits an authentication key to the user device in step 220. In other words, the client device receives the authentication key after having transmitted user credentials to the authentication appliance 350, i.e. after having logged in at the authentication appliance 350 or an authentication service at the authentication appliance 350.

The user of the client device may have a personal account at the authentication appliance 350 that is used to authorise the user for usage of specific services, such as attending a game located at a game server, e.g. the application server 310. The client device 330 may use the authentication key to prove to a server, e.g. the application server 310, that the client device 330 is operated by a specific user, for example a player, that has been authenticated by the authentication appliance 350. However, the authentication key that may be used as a proof of authentication in different server systems and/or for different purposes, may not be suitable or less suitable for controlling network traffic in order to prevent malicious data packets from reaching the application server 310. For example, the authentication key may be too long or too big in size to be incorporated in the data packets to be transmitted from client device 330 via control appliance 320 to application server 310.

The client device 330 sends the authentication key to the key generation appliance 340 which receives the authentication key in step 230. In exchange to the received authentication key received from the client device 330, the key generation appliance 340 may provide the client device 330 with the client key, in particular with the client key associated with the client device 330, as discussed with reference to method step 110.

In that manner the client key may be used by the control appliance 320 in order to determine whether or not to forward the data packet to the application server 310. A client key may be generated that is specifically designed for its use by the control appliance 320. Furthermore, the communication of the client key between the control appliance 320 and the key generation appliance 340 may be facilitated by using a client key generated by the key generation appliance 340 rather than using the authentication key. In particular, the control appliance 320 and the key generation appliance 340 may be based or comprised by the network traffic control device 360 as discussed above. As a further advantage, the client key may be generated and/or renewed independently of the authentication key, which may also be used for other purposes, thereby avoiding additional network traffic and/or additional coordination between the control appliance 330, the key generation appliance 340 and/or the authentication appliance 350. On the other hand, any data packet comprising the client key may be tied to an authentication key, i.e. to a user and/or a user device authenticated by an additional, independent authentication appliance.

Additionally, or alternatively, the authentication appliance 350 may directly communicate with the key generation appliance 340. In particular, the authentication appliance 315 may directly transmit the authentication key associated with the client device 330 to the key generation appliance 340.

In addition to, or in lieu of, the authentication key, the client device 330 may transmit a platform key associated with the client device to the key generation appliance 340, which is received by the key generation appliance 340 in step 240. The key generation appliance 340 may provide the client device 330 with the client key only upon receipt of the platform key and/or the authentication key. The platform key may be static, i.e. may not change upon a change of a user of the client device. In that manner, both the user of the client device and the client device may be authenticated and/or validated by the key generation appliance 340 prior to a provision of the client key to the client device 330 by the key generation appliance 340, as discussed with reference to method step 110.

Alternatively, or additionally, the client device 330 may communicate the platform key, or platform token, to the authentication appliance 350, wherein the authentication appliance 350 subsequently transmits the platform key and/or the authentication key to the key generation appliance 340.

Figure 3:
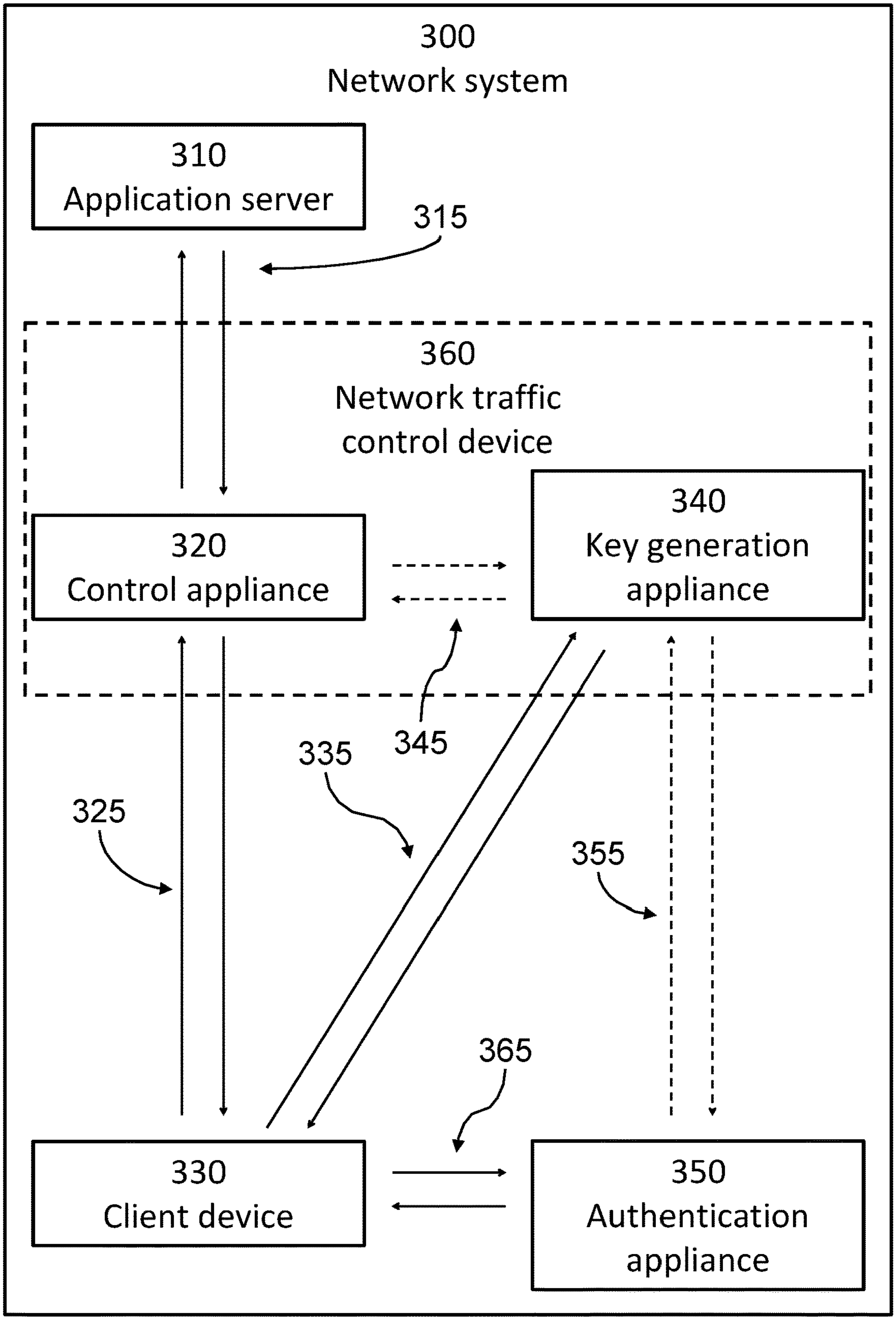
FIG. 3 shows a network system configured to perform method the first and/or the second method.

FIG. 3 shows the network system 300 configured to perform the methods 100 and 200 shown in FIGS. 1 and 2, as described with reference to said FIGS. 1 and 2. In particular, FIG. 3 shows network traffic control device 360 configured to perform method 100 as described with reference to FIG. 1.

More particularly, the network system 300 comprises the application server 310 communicatively coupled to control appliance 320 by a first network link 315. The network system 300 further comprises the client device 330 communicatively coupled to control appliance 320 and key generation appliance 340 by a second link 325 and a third network link 335, respectively. The network system 300 further comprises the key generation appliance 340 communicatively coupled to control appliance by a fourth network link 345. The network system 300 further comprises authentication appliance 350 communicatively coupled to the key generation appliance 340 by a fifth network link 355 and communicatively coupled to client device 330 by a sixth network link 365.

LIST OF REFERENCE SIGNS

100 First method
110-150 Method steps of the first method
200 Second method
210-240 Method steps of the second method
300 Network system
310 Application server
315 First network link
320 Control appliance
325 Second network link
330 Client device

335 Third network link
340 Ken generation appliance
345 Fourth network link
350 Authentication appliance
355 Fifth network link
360 Network traffic control device
365 Sixth network link

The invention claimed is:

1. A method for preventing malicious network traffic, the method comprising:

providing, by a key generation appliance, a client key to a client device;

receiving, by a control appliance, a data packet intended for an application server from the client device;

determining, by the control appliance, whether the data packet comprises the client key;

forwarding the data packet, by the control appliance, to the application server in response to a determination that the data packet comprises the client key; and blocking the data packet, by the control appliance, in response to a determination that the data packet does not comprise the client key;

wherein the client key provided to the client device is a first client key, and wherein determining whether the data packet comprises the client key, comprises:

determining, whether a previous data packet previously received from the client device comprises the first client key; and determining whether the data packet comprises a second client key derivable from the first client key, wherein the second client key is smaller in size than the first client key.

2. The method of claim 1, wherein determining whether the data packet comprises the client key, comprises:

determining whether the client key comprised by the data packet is valid.

3. The method of claim 1, wherein determining whether the data packet comprises the client key, comprises:

determining, based on a time stamp of the client key, whether the client key comprised by the data packet has not expired.

4. The method of claim 1, wherein determining whether the data packet comprises the client key, comprises:

determining, whether the client key comprised by the data packet is associated with at least one of the client device or a user of the client device.

5. The method of claim 1, wherein determining whether the data packet comprises the client key, comprises:

determining, whether the data packet comprises the client key at a predetermined position within the data packet.

6. The method of claim 1, further comprising:

receiving, by the key generation appliance, an authentication key, wherein the authentication key is indicative of an authentication of at least one of the client device or a user of the client device; and providing, by the key generation appliance, the client key to the client device in response to at least one of the receipt or a validation of the received authentication key.

7. The method of claim 1, further comprising:

receiving, by the key generation appliance, a platform key associated with the client device; and providing, by the key generation appliance, the client key to the client device in response to at least one of the receipt or a validation of the received platform key.

8. The method of claim 1, further comprising:

receiving, by an authentication appliance, user credentials of a user of the client device; and transmitting, by the authentication appliance, an authentication key to at least one of the key generation appliance or to the user device in response to at least one of the receipt of the user credentials or a validation of the received user credentials.

9. The method of claim 1, further comprising:

receiving by the control appliance, a plurality of data packets intended for the application server from the client device;

determining, by the control appliance, whether multiple of the plurality of data packets comprise the client key; and at least one of:

a) forwarding, by the control appliance, all of the data packets of the multiple data packets that comprise the client key to the application server; or b) blocking, by the control appliance, all of the data packets of the multiple data packets that do not comprise the client key.

10. The method of claim 9, further comprising:

blocking, by the control appliance, all of the data packets of the multiple data packets that do not comprise the client key; and forwarding the remaining data packets of the plurality of data packets to the application server.

11. An apparatus for preventing malicious network traffic, the apparatus comprising:

a control appliance; and a key generation appliance;

wherein the apparatus is configured to perform the method of claim 1.

12. A system for preventing malicious network traffic, the system comprising:

the apparatus of claim 11;

an authentication appliance, wherein the authentication appliance is configured to:

receive user credentials of a user of the client device; and transmit an authentication key to the key generation appliance in response to at least one of the receipt of the user credentials or a validation of the received user credentials.

13. The system of claim 12, further comprising at least one of:

the application server; or the client device.

14. A computer program stored in a non-volatile memory, the computer program comprising instructions which, when the program is executed by a computer, cause the computer to carry out the method of claim 1.

* * * * *